Aug. 16, 1966  M. KUTS  3,266,352
PUNCHING APPARATUS
Filed Dec. 1, 1964  3 Sheets-Sheet 1
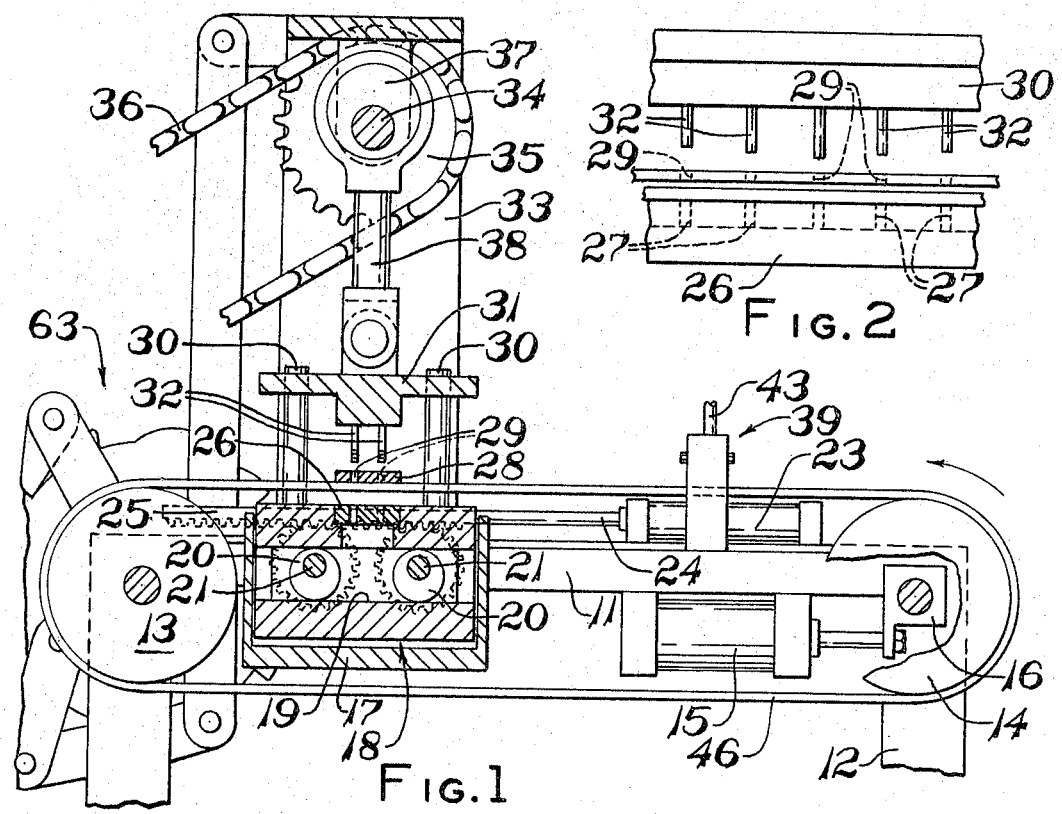
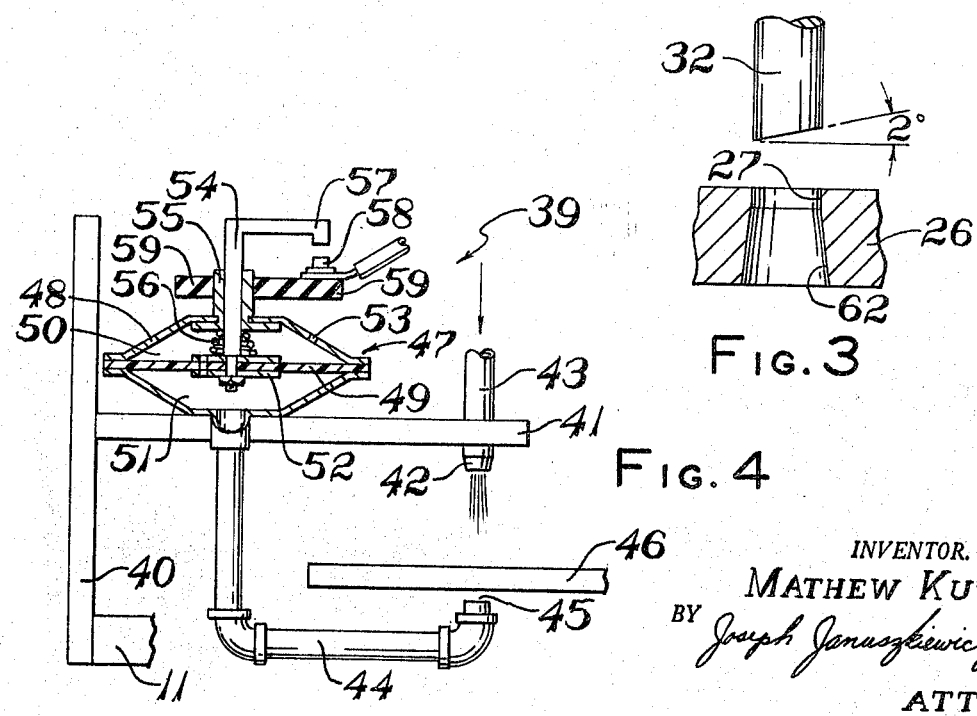
INVENTOR.
MATHEW KUTS
BY Joseph Januszkiewicz
ATTY.

Aug. 16, 1966  M. KUTS  3,266,352
PUNCHING APPARATUS
Filed Dec. 1, 1964  3 Sheets-Sheet 2

INVENTOR.
MATHEW KUTS
BY Joseph Januszkiewicz
ATTY.

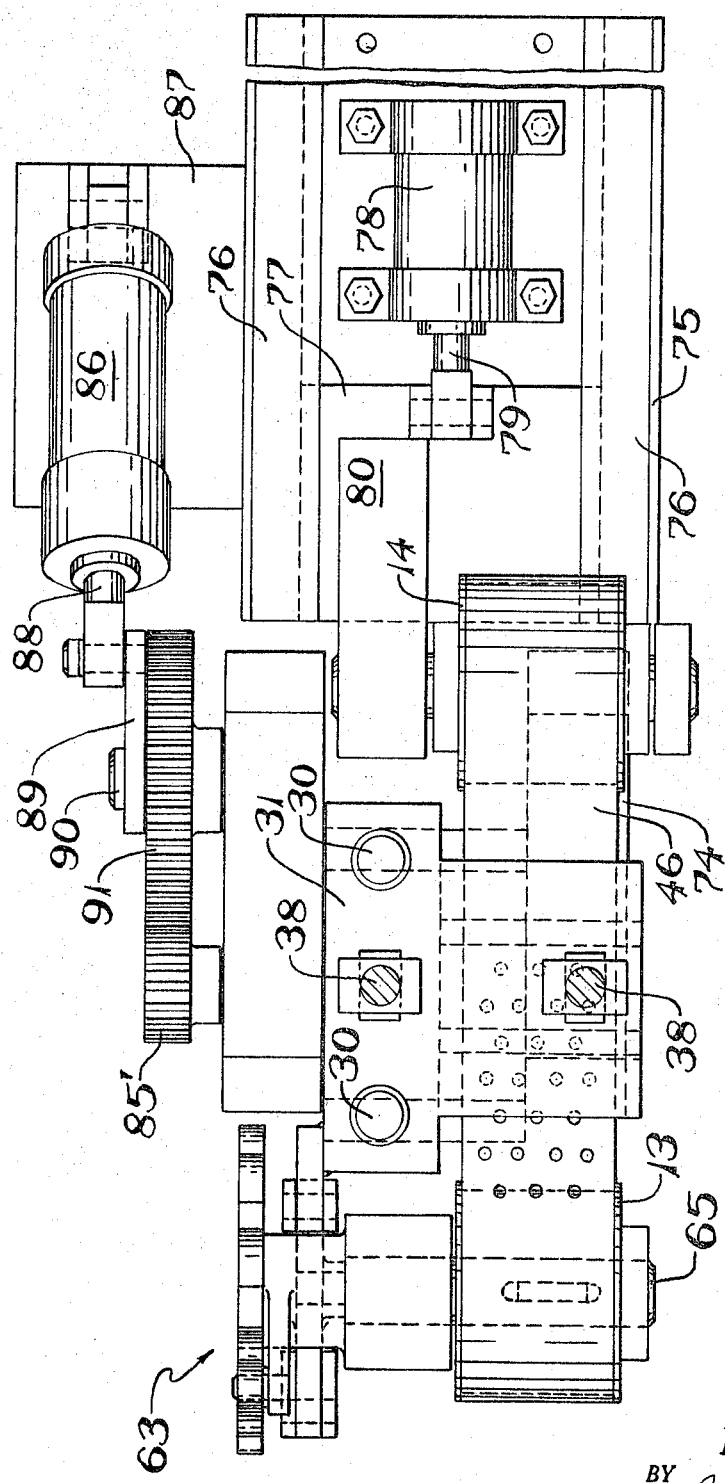

United States Patent Office 3,266,352
Patented August 16, 1966

1

3,266,352
PUNCHING APPARATUS
Mathew Kuts, Akron, Ohio, assignor to The B. F. Goodrich Company, New York, N.Y., a corporation of New York
Filed Dec. 1, 1964, Ser. No. 415,041
17 Claims. (Cl. 83—18)

This invention relates to a gang punch apparatus and method, and more particularly to an apparatus and method for punching small diameter holes in an endless belt.

In certain operations such as printing and duplicating it is necessary to have an endles belt having holes in the full width thereof as well as over the entire length thereof. The apparatus and method used heretofore in punching such belts have been cumbersome, slow, requiring considerable hand operations and therefore are expensive. It is an object of this invention to gang punch a plurality of holes for the entire length of the endless belt at high speed, and to maintain an accurate spacing of the holes, including the spacing of the first line of holes with the last line of holes. In addition the punch and die maintain alignment of the belt during the punching operation to assure proper spacing of the punched holes.

The present invention contemplates the use of movable means which positions the belt and die for a punching operation, punching means cooperating with an indexing mechanism which incrementally moves the belt for the following punching operation, and sensing means which maintains proper spacing between the first line of holes with the last line of holes and which moves the die and belt away from the punch upon completion of the punching operation without interrupting the punching cycle. Such action facilitates the loading and unloading of the endless belts without stopping the machine to thereby materially speed up the processing of the belts.

An object of the present invention is to punch accurately an endless belt at high speed.

It is a further object of this invention to provide an accurate control means which accurately spaces the plural holes in a belt.

Another object of this invention is to provide a gang punch having a novel cooperation between the punch and die which facilitates loading of the workpiece therebetween.

A further object of this invention is to provide a movable die which permits insertion of the workpiece without interrupting the punching cycle.

Another object of this invention is to provide a novel method of punching an endless belt.

A further object of this invention is to provide a method of punching holes in an endless belt without interrupting the punching cycle.

These and other objects of the invention will become more apparent upon consideration of the following detailed description of a preferred embodiment thereof, when taken in conjunction with the following drawings, in which:

FIG. 1 is a side elevational view of the belt punching apparatus embodying the invention, portions thereof being shown in section.

FIG. 2 is an enlarged fragmentary view of the punch, die and stripper elements in cooperative relationship.

FIG. 3 is an enlarged view of the die and the cutting portion of the punch.

FIG. 4 is an enlarged view of the sensing means.

2

Figure 5:
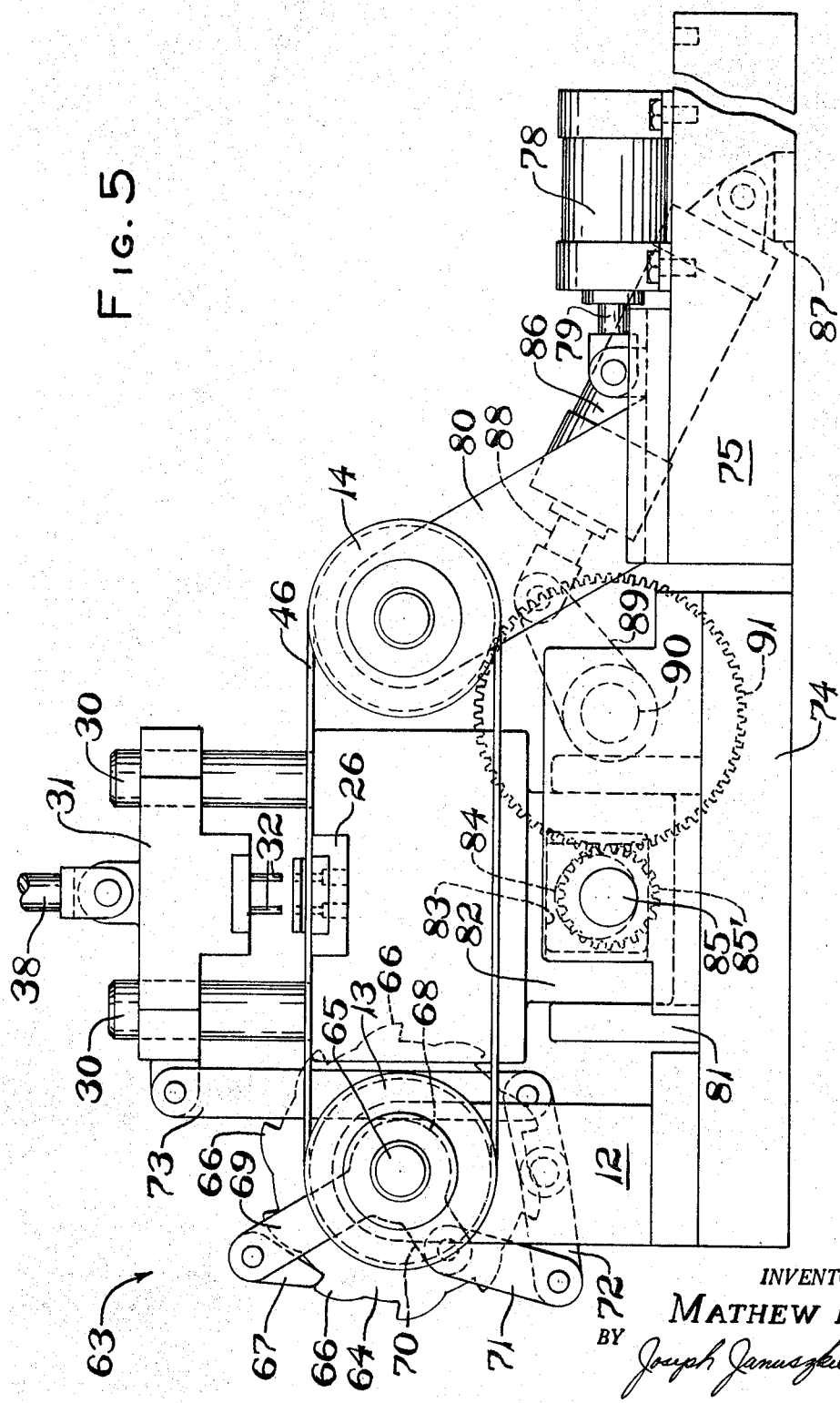

FIG. 5 is a side elevation of a modified form of the apparatus shown in FIG. 1.

FIG. 6 is a plan view of the apparatus shown in FIG. 5.

Referring now to the drawings, wherein like reference characters designate like or corresponding parts throughout the several views, there is shown in FIG. 1 a main frame 11 which is connected by a pair of spaced side frames 12 to a suitable base not shown. One end of main frame 11 supports a driven roller 13 while the other end of frame 11 supports a movable idler roller 14. A hydraulic cylinder 15 mounted on the underside of main frame 11 has its piston rod operatively connected to a pair of bosses 16 which journal the shaft which supports the idler roller 14. The bosses 16 are adapted to slide in suitable guideways (not shown) supported by the main frame 11 to permit rectilinear movement of the idler roller 14 toward and away from the driven roller 13. Pressurization of the head end of hydraulic cylinder 15 operates to moves bosses 16 rightwardly as viewed in FIG. 1 to thereby move idler roller 14 in a direction away from driven roller 13 to thereby provide a tensioning means upon an endless belt which is mounted between rollers 13 and 14. A bracket 17 having a pair of spaced vertically extending guide members is secured to main frame 11. The guide members of bracket 17 support for rectlinear movement slide 18, which slide 18 has a horizontally extending opening 19 which receives a pair of cylindrical cam members 20. Cam members 20 are eccentrically mounted on a shaft 21 whereby rotation of shaft 21 is adapted to move slide 18 upwardly or downwardly in accordance with the rotation of such cam. Suitably keyed to each shaft 21 is a spur gear 22. A hydraulic cylinder 23 is mounted on the main frame 11 and has a piston rod 24 which is connected to a horizontally extending rack 25. Rack 25 is operatively connected to the spur gears 22 in such a manner that reciprocation of the rack 25 rotates the spur gears 22 which in turn is adapted to move slide 18. Slide 18 has a die 26 suitably secured in the upper end portion thereof. Die 26 has a plurality of bores 27 in spaced transverse alignment or in at least two rows as seen in FIG. 1. It is to be understood that any desired number of rows of bores may be provided to facilitate plural punching. Mounted immediately above die 26 and secured to slide 18 for movement therewith is a stripper bar 28. Bar 28 is spaced from die 26 to permit the passage of a belt therebetween. Stripper bar 28 has a plurality of bores 29 which are in alignment with the bores 27 on die 26.

Main frame 11 supports a pair of vertically extending ways 30 on which is slidably mounted a cross slide 31. Cross slide 31 supports a plurality of punches 32 which are in alignment with the bores 27 and 29 such that reciprocation of the cross slide 31 drives the punches 32 into operative engagement with the bores 27. Main frame 11 additionally supports a standard 33 on which is journalled a shaft 34. A gear 35 keyed to shaft 34 is driven by a chain 36 from a suitable source not shown. Suitably keyed to shaft 34 is an eccentric 37 which eccentric 37 rotatably supports a pitman 38 whose lower end portion is connected to the cross slide 31 whereby rotation of the gear 35 imparts a rotation to the shaft 34 and eccentric 37 to cause reciprocation of the cross slide 31 on the ways 30. As seen in FIG. 1, reciprocation of the cross slide 31 will not punch holes in any belt since the stripper bar 28 maintains the belt out of operative engagement with the punch. Upon upwardly relative movement of slide 28 along with the stripper bar 28, the bores 27 of die 26 are within the effective punching range of punches 32.

The sensing means 39 (FIGS. 1 and 4) for operating a solenoid valve which controls the pressurization of hydraulic cylinder 23 is mounted on a bracket 40 which is secured to the main frame 11. Bracket 40 supports a horizontally extending bracket 41 on which is mounted a nozzle 42 that is connected to an air supply line 43. Nozzle 42 is directed downwardly towards the main frame 11 to direct pressurized air to a conduit 44 having a receiving orifice 45. The orifice 45 is in vertical alignment with the nozzle 42 to receive pressurized air therefrom. As seen in FIG. 4, an endless belt 46 covers the orifice 45 and blocks the air passage from nozzle 42 to conduit 44. Bracket 40 additionally supports the pressure responsive diaphragm control switch 47 which is connected to conduit 44. Control switch 47 comprises a two-part housing 48 containing a flexible diaphragm 49 which cooperates with such housing 48 to define a pair of spaced chambers 50 and 51. Chambers 50 and 51 are connected to each other via a throttle valve 52. Chamber 50 is vented to atmosphere by a bore 53 in housing 48 whereas chamber 51 is connected to conduit 44 and via opening 45 to nozzle 42 and the air pressure from conduit 43 except as the air flow is interrupted by the passage of the belt 46 therebetween. An upwardly extending switch contact rod 54 is connected to diaphragm 49 for reciprocable guided movement through a guide block 55 mounted on the housing 48. A spring 56 encompassing rod 54 has its one end seated on the upper end of the guide block 55 and its other end seated on the diaphragm 49 to bias such contact rod 54 downwardly. The upper end portion of rod 54 has an outwardly extending arm portion 57 that is adapted to contact an electrical contact 58 which contact 58 is supported by an insulating block 59. The contact 58 is spaced in vertical alignment immediately below the outwardly extending arm portion 57 of contact rod 54, providing a normally open switch and a circuit having one side grounded to the machine. When chamber 51 is pressurized, the outermost end portion of rod 54 is maintained out of contact with electrical contact 58 but when chamber 51 is cut off from the pressure source as by the passage of a belt 46 between nozzle 42 and orifice 45, spring 56 biases diaphragm 49 downwardly along with contact rod 54 to thereby make contact with switch 58 which in turn energizes the solenoid valve, not shown, which pressurizes the head end of hydraulic cylinder 23 to cause the piston 24 and rack 25 to move leftwardly as viewed in FIG. 1 to cause a counterclockwise rotation to the eccentrics 20 wherein the slide 18 and stripper bar 28 are moved upwardly to thereby maintain the stripper bar 28 and belt 46 in line with the punches 32, such that the reciprocation of the cross slide 31 and the punches 32 will effect a punching of holes on the belt supported between the rollers 13 and 14. In addition to such action, hydraulic cylinder 15 will be pressurized to maintain idler roller 14 rightwardly as viewed in FIG. 1 to maintain tension on the belt 46 held between idler rollers 14 and 13.

FIG. 3 shows an enlarged view of the punch and die wherein the die 26 has a plurality of bores 27 with downwardly extending tapering portions 62 to accommodate that portion of the belt which is punched out. The cutting edge of the respective punches 32 have a two-degree tapering angle thereon (exaggerated for clarity of showing) and the respective punches are so arranged that only two punches penetrate the belt at the same time to thereby facilitate punching action. This arrangement is shown in FIG. 2.

Suitably connected to roller 13 is an indexing device indicated generally as 63 in FIG. 1 and disclosed in more detail in FIGS. 5 and 6 (a modified form of the invention).

Indexing device 63 comprises a ratchet wheel 64 keyed to a shaft 65 on which roller 13 is mounted, whereby rotation of shaft 65 simultaneously rotates roller 13 and ratchet wheel 64. Ratchet wheel 64 has a plurality of circumferentially spaced index teeth 66 for engagement by a pawl 67. Journalled on shaft 65 for free rotation thereon is an index disk 68 having a pair of circumferentially spaced arm portions 69 and 70. Arm portion 69 is pivotally connected to the pawl 67 whereas arm portion 70 is pivotally connected via link 71 to one end of lever 72, which lever 72 is pivotally mounted at its intermediate portion to the side frame 12. The other end of lever 72 is pivotally connected to a link member 73, which link member 73 is pivotally connected to the cross slide 31 as clearly shown in FIG. 5 to cause reciprocable movement of the link member 73 with the cross slide 31. On the downward stroke of cross slide 31 link member 73 pivots lever 72 in a clockwise direction as viewed in FIG. 5 to impart a clockwise rotation to the index disk 68 and a similar clockwise rotation to the arm portion 69 along with the pawl 67 causing pawl 67 to ride over the index teeth 66. On the upward movement of cross slide 31, link member 73 imparts a counterclockwise rotation to lever 72 which in turn imparts a counterclockwise rotation to the index teeth 68 causing arm portion 69 to impart a counterclockwise rotation to the pawl 67 which being engaged with the index teeth 66 necessarily imparts a counterclockwise rotation to the ratchet wheel 64 and the roller 13. Such rotation of roller 13 provides an indexing action to the belt 46 thereby bringing an unpunched portion of the belt into position beneath the punches 32.

In the operation of the device described, rotation is imparted to the spur gear 35 by energization of a motor, not shown, which in turn drives chain 36. Gear 35 rotates shaft 34 and the eccentric 37 connected thereto which in turn reciprocate the cross slide 31 on ways 30 via the pitman arm 38. The head end of hydraulic cylinder 15 is pressurized to exert a rightward movement on the idler roller 14 to thereby tension the belt 46 which is positioned between rollers 13 and 14. The head end of hydraulic cylinder 23 is then pressurized which imparts a counterclockwise rotation to the eccentrics 20 which thereby move slide 18 upwardly as viewed in FIG. 1 to position the die 26 and stripper bar 28 which holds the belt 46 therebetween into a position where the reciprocation of the punches 32 punch holes into the belt 46. Upon retraction of the cross slide 31 from the punching operation, an indexing action is imparted to the roller 13 as described in detail above to impart an incremental movement to the belt 46 to move an unpunched surface into position beneath the punches 32. After numerous punching and indexing movements, the sensing means 39 (described in detail above) senses the passage of the punched holes thereunder to permit the pressurization of the lower chamber 51 which thereby moves the contact rod 54 upwardly to break the contact between electrical contact 58 and the arm portion 56, which action deenergizes a time delay switch, not shown. De-energization of the time delay switch operates to pressurize the rod end of hydraulic cylinder 23 which in turn imparts a clockwise rotation to the eccentrics 20 which thereby move the slide 18 out of contact with the belt 46. Such action moves the die 26 downwardly along with the stripper bar 28 and thereby permits the continued reciprocation of the cross slide 31 without any resulting punching on the belt by the punches 32. Simultaneously with such action the rod end of hydraulic cylinder 15 is pressurized to relieve the tension of the endless belt 46 and permits the removal of such belt from between rollers 13 and 14 and permits the insertion of a new belt to be punched without requiring a shut down of the machine. A second belt is punched in the same manner as discussed above and such operation is continued without interrupting the punching cycle of the cross slide 31 which thereby permits the high speed punching operation.

A modification of the above-described punching apparatus is shown in FIGS. 5 and 6 wherein similar parts are designated by the same numerals and the modified portions thereof are given different numerals. The main frame 74 supports the forwardly disposed pair of spaced side frames 12 as in the original embodiment, which side frame 12 support the indexable roller 13 and the indexing mechanism 63 described in detail above. The other end of main frame 74 supports a guide block 75 which has a pair of spaced ways 76 which guide a slide member 77 in a rectilinear movement thereon. The hydraulic cylinder 78 is adjustably mounted on the guide block 76 having its rod end 79 pivotally connected to the slide member 77 for movement thereof. As seen in FIGS. 5 and 6 the rearward portion of guide block 75 has additional threaded bore holes to accommodate the hydraulic cylinder 78 in the event a larger belt is to be processed. An upwardly extending bracket 80 is mounted on slide member 77 and has rotatably mounted on the upper end thereof the roller 14 to thereby provide support for an endless belt 46 as in the original embodiment. Pressurization of the head end of hydraulic cylinder 78 operates to move slide member 77 and the roller 14 leftwardly as seen in FIG. 5 to remove the tension on endless belt 46 whereas pressurization of rod end of hydraulic cylinder 78 operates to move slide member 77, bracket 80 and roller 14 as viewed in FIG. 5 to provide a tension on the endless belt 46 to condition such belt 46 for a punching operation.

Secured to main frame 75 is a guide block member 81 having a pair of vertically extending guideways to guide for up and down movement a slide member 82. To maintain the vertical alignment of the slide member 82 a pair of space vertically extending ways 30 slidably engage the slide member 82 as in the original embodiment such that the reciprocation of the slide member 82 is maintained in alignment with the punch 32 and the cross slide 31 as in the original embodiment. Slide member 82 has a horizontally extending slot 83 which receives a slide block having an eccentric 84 (shown in dotted lines in FIG. 5). Eccentric 84 is rotated by a shaft 85 secured to gear 85′, which gear 85′ is journalled for rotation on the side of main frame 74. Rotation of gear 85′ imparts a vertical or downward movement to slide member 82 depending on the direction of rotation of the gear 85′.

A hydraulic cylinder 86, pivotally mounted on a side bracket 87 that is secured to the main frame 74 has its rod end 88 pivotally connected to a link 89 that is keyed to a shaft 90. Suitably keyed to shaft 90 is a spur gear 91 which meshes with spur gear 85′ such that rotation of spur gear 91 imparts a rotation to gear 85′ and a consequent upward or downward movement to slide member 82. Energization of the head end of hydraulic cylinder 86 extends the rod end 88 and imparts the counterclockwise rotation to gear 91 and a clockwise rotation to gear 85′ which will move slide member 82 in a downward direction to move the die 26 along with belt 46 into position where belt 46 and die 26 are out of possible engagement by the punches 32 for a punching operation. Pressurization of the rod end of hydraulic cylinder 86 operates to move the rod end 88 downwardly and impart a clockwise rotation to link 89 and gear 91 which in turn imparts the counterclockwise rotation to gear 85 which in turn moves slide member 82 into an upward direction to the position shown in full lines in FIG. 5 to thereby move the belt 46 and the die 26 into a position for engagement by the punches 32. A sensing means similar to the sensing means 39 as in the original embodiment is provided; however, for clarity of showing the other elements, such sensing means is not shown in FIGS. 5 or 6. The operation of the modified device is similar in all respects to the original embodiment.

It should be understood, of course, that the foregoing disclosure relates to preferred embodiments of the invention and that numerous modifications and alterations may be made therein without departing from the spirit and the scope of the invention as set forth in the appended claims.

I claim:
1. In a press comprising a support frame, said support frame having support means, means for actuating and de-actuating said support means, said support means in said actuated condition operative for moving material to be punched incrementally along a longitudinal center line, die means movable selectively between a first position and a second position, said die means in said first position having its upper surface substantially in line with said longitudinal center line, punch means mounted on said support frame for guided continuous rectilinear movement thereon for punching holes in the material supported by said support means in cooperation with said die means in said first position, said die means in said second position cooperative with said support means in said de-actuated condition for presenting the upper surface of said die means and material supported between said support means to a position below said longitudinal center line and below the lowermost point of movement of said punch means to prevent operation of said punch means on material supported by said die means and said support means, and means for moving said die means selectively to said second position upon de-actuation of said support means.

2. In a press the combination comprising a frame, a pair of spaced support means supporting an endless belt, means for moving one of said support means to control the tension of such belt held thereby, a pair of slides movable toward and away from each other in a direction normal to the directions of the runs of a belt held by said support means, punch means on one of said slides and die means on the other of said slides, said punch and die cooperative to punch holes in a belt supported by said support means with said slides located closely adjacent each other, and means operatively connected to said slides to reciprocate said one slide continuously while moving said other slide closely adjacent such belt being punched whereby said punch and die cooperate to punch a hole in such belt.

3. In a press the combination comprising a frame, a ram mounted on said frame, means for reciprocating said ram continuously from a first direction to a second direction, belt support means operative to maintain tension on a belt, said support means operative to feed a belt in a direction normal to said first direction to define a reference plane, a slide mounted on said frame movable thereon in said second direction to said reference plane to support a belt, punch means on said ram co-operative with die means on said slide to provide the punching of holes in a belt held by said belt support means, and sensing means being operative to move said slide in said first direction away from said reference plane to interrupt punching of holes in a belt supported by said belt support means without interrupting the reciprocation of said ram.

4. In a press comprising a frame, a pair of spaced belt support means, means operatively connected to one of said support means for moving said one support means relative to the other of said support means to control the tension of an endless belt held by said support means, indexing means operatively connected to the other of said support means for selective indexing said other support means to move a belt held between said spaced support means, said belt support means defining a pass line therebetween coincident with one run of a belt held therebetween, a pair of slides mounted on said frame for reciprocable movement in a direction normal to said pass line, means operatively connected to one of said slides for reciprocating said one slide in a direction normal to said pass line, power operated means operative to move the other of said slides from a first inoperative position to a second operative position wherein said second operative position is adjacent said pass line, sensing means operative to actuate said power operated means to move said other slide to said second position away from said pass line, and punch and die means on said slides respectively and cooperative with each other to produce a series of holes on an endless belt held by said belt support means when said other slide is in said second position.

5. In a press comprising a frame; a pair of rolls mounted on said frame; the axes of said rolls being spaced and parallel; means operatively connected to one of said rolls for moving said one roll and its corresponding axis toward and away from the axis of the other of said rolls while maintaining said axes parallel to thereby control the tension of an endless belt encircling said rolls; the belt encircling said rolls having an upper run defining a plane, a slide mounted on said frame below said plane movable in a first direction normal to said plane which first direction is away from said plane and movable in a second direction which direction is toward said plane, said slide having die means thereon; said slide having a stripper plate thereon which stripper plate is cooperative with said die to hold a portion of such belt therebetween; means operatively connected to said slide for moving said slide, die means in said first direction to a first position closely adjacent said plane whereby the upper run of such belt between said stripper plate and said die means is positioned in said plane; and said means operatively connected to said slide being operative to move said slide, stripper plate and said die means in said second direction to a second position away from said plane.

6. In a press as set forth in claim 5 wherein said frame supports a movable ram, said ram having a plurality of punches movable therewith and adapted to cooperate with said die means in said first position to punch holes in a belt held between said stripper plate and said die means.

7. In a press as set forth in claim 6 wherein said frame has indexing means operatively connected to said other roll for indexing said other roll and such belt held thereby.

8. In a press as set forth in claim 7 wherein sensing means is mounted on said frame to move said slide between said first and second position.

9. In a press as set forth in claim 8 wherein said pair of rolls are adjustably mounted on said frame to accommodate different size endless belts.

10. In a press comprising a frame, a pair of spaced endless belt support means, means operatively connected to one of said support means for moving said one support means relative to the other of said support means to control the tension of an endless belt held by said support means, a movable slide member mounted on said frame; said slide member having die means and a stripper plate spaced from said die means, said stripper plate lying in a first plane generally parallel to a plane containing the axes of rotation of said belt support means when said slide member is in a first position which is an uppermost position, and said first plane being substantially coincident with the plane tangent to the upper portion of said rolls whereby a belt supported by said roll passes between said stripper plate and die means, power operated means for moving said slide member from said first position to a second position away from said first plane, sensing means mounted on said frame operative to actuate said power operated means for moving said slide member and said stripper plate to said second position, reciprocating punch operating means on said frame cooperative with said die means on said slide member in said first position to punch a plurality of holes in such endless belt supported by said endless belt support means, and said punch means being ineffective to punch holes in such endless belt support by said endless belt support means and said stripper plate when said die means on said slide member is in said second position.

11. A device for perforating an endless belt comprising a frame, said frame supporting a pair of spaced cylindrical support members operative to support an endless belt thereon, said members cooperating to define a forward run therebetween by a plane tangent to both of said members and cooperative to define a return run therebetween by a plane tangent to both of said members, the axes of said cylindrical support members lying in a plane that is parallel to said tangent planes and said runs, means operatively connected to one of said support members for moving said one support member to a first position away from the other of said support members to tension an endless belt held therebetween and for moving said one support member to a second position toward said other support member to relieve tension on an endless belt held between said spaced support members, a ram mounted on said frame, means for continuously reciprocating said ram, a gang of independent punches mounted on said ram for reciprocation therewith, a slide mounted on said frame, actuating means operative to move said slide from a first inoperative position to a second operative position wherein the upper surface of said slide in said second position lies in a plane closely adjacent said forward run, said slide in said first position having said upper surface spaced from said forward run, a plurality of dies on said slide cooperating with said punches to punch holes in the forward run of an endless belt supported by said support members with said one support member in said second position, and said slide having a stripper plate cooperative therewith to depress the forward run of an endless belt with said slide in said first position.

12. A device as set forth in claim 11 wherein indexing means is operatively connected to said other support member for incrementally indexing thereof, and said means for reciprocating said ram operative upon retraction of said ram for actuating said indexing means to incrementally rotate said other support member.

13. A device as set forth in claim 12 wherein sensing means mounted on said frame is operative to energize said actuating means to move said slide from said second operative position in said first inoperative position.

14. A device as set forth in claim 13 wherein said punches on said ram have a forwardly disposed cutting surface, said forwardly disposed cutting surfaces define a generally V-shaped arrangement whereby said punches cooperate in seriatim order with said dies in timed relationship conditioned upon said one support member being in said first position and said slide being in said second position.

15. The method of punching holes in an endless belt comprising the steps of locating a belt, simultaneously tensioning such belt and positioning die means adjacent a surface portion of such belt within a punching zone, punching holes in such belt in cooperation with such die means, and releasing the tension on such belt while simultaneously moving such belt away from said punching zone.

16. The method of punching holes in an endless belt comprising the steps of tensioning an endless belt to provide a taut upper forward run and a taut return run, positioning a die means closely adjacent the lower surface of such forward run to define a punching zone, punching holes in such belt by a ram cooperating with such die means, incremental indexing such endless belt between punching of such holes in the belt, and releasing the tension on such belt simultaneously with the repositioning of such die away from the punching zone whereby such upper forward run is removed from the punching zone during the continued reciprocation of such ram.

17. The method of punching holes in an endless belt comprising the steps of reciprocating a punch within a punching zone, positioning a belt on support means, simultaneously tensioning such belt and moving a die underneath the upper run of such belt to hold such upper run in the punching zone, incrementally indexing such belt between reciprocal strokes of the punch, and simultaneously releasing the tension on such belt while moving the die away from the punching zone.

(References on following page)

References Cited by the Examiner

UNITED STATES PATENTS

| | | | |
|---|---|---|---|
| 804,108 | 11/1905 | Evans et al. | 83—622 |
| 1,611,781 | 12/1926 | Russell et al. | 83—436 X |
| 1,908,563 | 5/1933 | Slabaugh et al. | 83—623 X |
| 2,528,282 | 10/1950 | Melberg | 83—156 X |
| 2,612,950 | 10/1952 | Ewing | 83—175 |
| 3,031,907 | 5/1962 | Stewart | 83—622 X |
| 3,104,805 | 9/1963 | Holicky | 234—155 X |
| 3,186,634 | 6/1965 | Foster et al. | 234—115 X |
| 3,194,099 | 7/1965 | Palter | 83—622 X |

WILLIAM W. DYER, Jr., *Primary Examiner.*

J. M. MEISTER, *Assistant Examiner.*